United States Patent Office 3,173,958
Patented Mar. 16, 1965

3,173,958
ETHERS OF OLEFIN ALCOHOLS
Jack Milgrom, Park Forest, and Wilbert H. Urry, Chicago, Ill., assignors to Standard Oil Company, Chicago, Ill., a corporation of Indiana
No Drawing. Filed Dec. 17, 1959, Ser. No. 860,086
8 Claims. (Cl. 260—611)

This invention relates to the preparation of mono-olefinic ethers wherein the unsaturation is allylic with respect to the ether oxygen as, for example, in diallyl, dimethylallyl and dicinnamyl ethers and in mixed alkyl allyl, methylallyl and cinnamyl ethers which may be prepared directly by reactions involving an olefin alcohol having its unsaturation allylic to the hydroxy group with itself or with an alkyl alcohol to produce a mixed ether. A different mixed ether can be produced by a transetherification reaction wherein a mixed alkyl allylic ether is reacted with an alkyl alcohol containing a different alkyl group. More specifically, this invention pertains to the preparation of such allylic group containing ethers employing a novel catalyst system.

Diallyl ether has been prepared by reacting allyl alcohol with sulfuric acid or liquid hydrogen chloride, by the treatment of vaporized allyl alcohol over calcined alum or pumice, by the reaction of allyl alcohol with dimethyl sulfate and alkali, by the reaction of allyl alcohol with dimethyl sulfate and alkali, by the reaction of allyl alcohol with diazomethane and by the reaction of allyl alcohol, methyl iodide and silver oxide. Mixed alkyl allyl ethers have been prepared by the reaction of an allyl halide with an alkali alcoholate, by the reaction of allyl alcohol with ethyl benzene sulfonate (ethyl allyl ether), by the vapor phase reaction of allyl alcohol and an alkyl alcohol over calcined alum, and by the reaction of allyl alcohol with alkyl alcohols in the presence of mercury salts.

The disadvantages of the foregoing processes are readily apparent. For example, sulfuric acid is quite corrosive. Liquid hydrogen chloride is rather difficult to handle and the etherifications employing it as a catalyst require the use of specially designed pressure equipment. The vapor phase processes employing rather high temperatures result in low yields. Other of the processes require the use of rather esoteric co-reactants. The use of mercury salts results in reducing mercury to the metal which cannot be used per se in subsequent ether preparations.

We have discovered that allylic ethers, that is ethers containing one or two allylic groups, can be readily prepared by carrying out the reaction in the presence of platinum (II) ion, probably as a platinum (II)-allylic alcohol complex formed in situ. This catalyst system is useful for the preparation of di (allylic) ethers such as diallyl ether, dimethylallyl ether, dicinnamyl ether and the like from an allylic alcohol; for the preparation of a mixed alkyl allylic ether by reacting an alkyl alcohol with an allylic alcohol such as, for example, reacting methyl, ethyl, propyl, isopropyl, n-butyl, sec-butyl, tertiary-butyl, n-octyl, 2-ethylhexyl, benzyl, phenylethyl and the like alcohols with allyl, methylallyl, cinnamyl alcohols and the like; or for the preparation of similar mixed alkyl allylic ethers by transetherification as, for example, by reacting n-propyl alcohol with allyl ethyl ether to form allyl n-propyl ether and ethanol or diallyl ether with sec-butyl alcohol to form allyl sec-butyl ether and allyl alcohol. An outstanding advantage of the process of this invention is that saturated ethers, dialkyl ethers, are not produced in either the direct etherification or transetherification.

The platinum-allylic alcohol complex employed as a catalyst in the process of this invention can be provided by preforming the complex as, for example, by reacting allyl alcohol or allyl ether with a haloplatinic acid or with platinic halide and a mineral acid and adding the complex to the reaction mixture. The complex may also be formed in situ by adding the haloplatinic acid or platinic halide and mineral acid with the reactants. A platinum (II) allylic ether chelate complex can be recovered from a prior ether preparation and employed with a mineral acid to provide the catalyst system. Formation of the complex in situ or preforming the complex using a haloplatinic acid probably involves the reduction of platinum (IV) to platinum (II) and the subsequent formation of platinum (II)-allylic alcohol complex. This complex ultimately is converted to a platinum (II)-allylic ether chelate complex when hydrogen halide is lost from the etherification reaction or in a batch process the ether is recovered from the reaction mixture. Also, as the reaction progresses over long periods of time as in a continuous process, the volatile hydrogen halides are lost. However, the reaction is again activated upon addition of the hydrogen halide initially formed in situ or by addition of a mineral acid such as sulfuric acid. Only small amounts of the catalyst, platinum (II) allyl alcohol complex, are required; the precise amount is not critical but rather is a matter of economics. Only a catalytically active amount need be employed. Satisfactory results will be obtained when employing the catalyst system in an amount of complex and acid corresponding to from 0.1 to 5 mole percent, desirably less than 2 mole percent and preferably from 0.2 to 1 mole percent, haloplatinic acid based on the allylic alcohol. The platinum (II)-allylic ether chelate complex itself does not function as a catalyst but rather is converted to the catalyst by a mineral acid. The amount of mineral acid, hydrogen halide or sulfuric acid, added with platinic halide or recovered chelate complex will be in the ratio of two equivalents per equivalent of platinic halide or chelate complex. On a mole ratio basis, therefore, two moles of hydrogen halide per mole of platinic halide or chelate complex, or one mole of sulfuric acid per mole of platinic halide or chelate complex will supply sufficient mineral acid for the purposes of this invention. For prolonged operation and especially for continuous operation the use or addition of sulfuric acid as the mineral acid is preferred because of its lower volatility.

With respect to the direct preparation of mixed ethers, the catalyst is effective with all ratios of reactant alcohols. However, it is the mole ratio of alkyl alcohol to allylic alcohol which governs the nature of the ether products. For example, when from substantially equal molecular amounts of alkyl alcohol and allylic alcohol up to about two moles of alkyl alcohol per mole of allylic alcohol are employed, a mixture of about equal molar amounts of alkyl allylic ether and di (allylic) ether is produced. The production of the mixed alkyl allylic ether can be maximized by employing a substantial excess, above about 2 moles alkyl alcohol per mole of the allylic alcohol. The formation of alkyl allylic alcohol can also be enhanced by removal of water from the reaction mixture. Removal of the ether as formed enhances the reaction rate. When the allylic alcohol is present in excess, the major product is the di (allylic) ether. In the transetherification reaction to produce a different alkyl allylic ether, equimolecular proportions of the alkyl allylic ether and alkyl alcohol may be employed, but it is advantageous to use two or more moles of the alkyl alcohol per mole of the ether.

The direct etherification reactions or transetherifications are rapid at temperatures up to about 100° C. and are reactions even satisfactorily high at the boiling point of the reaction mixture when below 100° C. Hence, the process need not be carried out at higher reaction temperatures. However, at temperatures above about 100° C. the catalyst complex decomposes to what appears to be metallic platinum and no reaction takes place thereafter. The reaction time may be substantially shortened and the product distribution may be controlled by distilling off the ether and water as they are formed.

The process of this invention will be illustrated by the following examples.

*Example 1*

To a reactor having a means for measuring the temperature of its contents, a stirrer, and a reflux condenser there are added 0.735 gram mole allyl alcohol and 0.254 mole percent chloroplatinic acid. This mixture is a homogeneous orange solution. The orange solution is heated to its boiling point, 92° C., and in 10 minutes changes to a yellow solution. The reaction mixture is maintained under reflux conditions for 4 hours. As the reaction proceeds, the temperature of the liquid reaction mixture drops to 78–79° C.

The reaction mixture is distilled to remove unreacted allyl alcohol and reaction products. A black residue containing platinum remains in the still pot. The distillate is partitioned between water and pentane. The pentane layer is washed with dilute aqueous solution of ferric chloride and is dried. The dried pentane solution is distilled through a Vigreux column. A single fraction boiling at 94° C. is taken and represents a 55 mole percent yield. This product has a refractive index $n_D^{20}$ 1.4153 and according to gas chromatography is allyl ether. Infrared and mass spectra of the product are identical with authentic allyl ether.

In the above process, when chloroplatinic acid is replaced with the same mole percent platinic chloride and $H_2SO_4$, HCl, HBr or other mineral acid in the proportion of two equivalents thereof for each equivalent of platinic chloride, substantially equivalent results are obtained.

*Example 2*

Allyl alcohol, 0.442 gram mole; t-butyl alcohol, 0.529 gram mole; and 0.478 mole percent chloroplatinic acid based on allyl alcohol are charged to apparatus described in Example 1, except a Dean and Stark tube of 10 ml. capacity is attached between the condenser and the reactor. The reaction mixture, an orange solution, is heated to boiling, 85° C., and maintained under reflux conditions. After 20 minutes the reaction mixture became yellow and after about 60 minutes water began to separate in the Dean and Stark tube. The temperature of the reactants dropped to 80° C. The reaction mixture is cooled to 25–27° C. and a crystalline platinum (II)-allyl ether complex precipitates. The precipitate could be removed by filtration and used to provide the catalyst system for subsequent reactions. However, in this case it is not removed, but rather the entire reaction mixture is distilled, first at atmospheric pressure and then finished at reduced pressure over the range of 49–56° C. to prevent decomposition of the complex. The distillate is extracted with pentane, the pentane extracts are washed and dried as before. The dry pentane solution is distilled through a Vigreux column. The conversion of allyl alcohol to t-butyl allyl ether is found to be 57 mole percent. The mole ratio of this mixed ether to allyl ether is 0.95.

*Example 3*

The process of Example 2 is repeated, except that 0.434 gram mole allyl alcohol, 0.835 gram mole t-butyl alcohol and 0.0023 gram mole chloroplatinic acid are employed. The reaction temperature is maintained at 72° C. throughout. The reaction mixture is distilled and a distillate boiling at 72 to 80° C. is recovered. The platinum (II)-ether complex and 5.8 grams of ether remained in the still pot. Conversion of allyl alcohol is 77.4%, and equimolecular proportions of allyl ether and allyl tert. butyl ether were produced.

By carrying out the same reaction but by adding allyl alcohol slowly to the reaction mixture to maintain an excess of t-butyl alcohol, the yield of t-butyl allyl ether can be maximized. Also, by starting with a greater excess of t-butyl alcohol, about 6 moles per mole of allyl alcohol, the yield of t-butyl allyl ether can be maximized.

*Example 4*

In the aparatus of Example 1, there are combined 0.426 mole allyl alcohol, 0.666 mole n-propyl alcohol and 0.830 mole percent chloroplatinic acid based on allyl alcohol. The resulting orange solution is heated to its boiling point, 94° C., and maintained under reflux conditions for two hours. A low boiling azeotrope forms and the temperature for reflux drops to 83° C. The reaction mixture is distilled at atmospheric pressure to 100° C. The residue darkens due to decomposition of the platinum-ether complex. The distillate is partitioned with pentane and water as before. The pentane solution is washed, dried and distilled through a Vigreux column. A 55 mole percent yield of n-propyl allyl ether, $n_D^{20}$ 1.4153 and boiling point of 94° C. is obtained.

*Example 5*

A solution containing 0.427 gram mole allyl alcohol, 2.63 gram moles isopropyl alcohol and 0.0018 gram mole chloroplatinic acid is heated to its boiling point, 83° C., in a reactor as described in Example 1. As the reaction proceeds, the solution color changes from orange to yellow and the reaction temperature drops to 78° C. When the reaction is complete, the reaction mixture is distilled leaving an ether product residue and platinum (II)-ether complex (3.6 grams). The distillate is partitioned between water and pentane. After washing and drying the pentane extract as before, it is distilled through a Vigreux column. The allyl alcohol conversion is 70.3 mole percent. The ether product contains 0.24 mole allyl isopropyl ether and 0.03 mole allyl ether.

The foregoing examples illustrate the use of chloroplatinic acid to form in situ the catalyst for the process of this invention. That the platinum (II)-allylic ether complex appearing in the cooled reaction mixture or in the residue from the distillation of the reaction mixture to obtain the distillate from which the ether product is recovered, can be employed as the catalyst as hereinbefore described will now be illustrated.

*Example 6*

A preparation of allyl ether by heating a solution containing allyl alcohol, benzene and chloroplatinic acid is first carried out. The reaction mixture is distilled to remove substantially all of the reaction product. The cooled still pot residue containing a small amount of ether product and a yellow solid is heated to carefully evaporate the ether. The yellow, solid residue is found to be insoluble in water and pentane but soluble in hot alcohol or benzene. The yellow solid is taken up in benzene and recrystallized as a white crystalline solid therefrom. These white crystals are recoverd, washed with pentane and dried. This solid is found to be allyl ether-platinum (II) chloride: $C_6H_{10}OPtCl_2$. The chemical composition by analysis and by calculation is:

|  | Analysis, Percent | Calculated, Percent |
| --- | --- | --- |
| Carbon | 19.44 | 19.78 |
| Hydrogen | 2.83 | 2.77 |
| Platinum | 52.5 | 53.6 |
| Chlorine | 17.8 | 19.5 |

Comparison of infrared spectra of the white crystalline solid with the infrared spectra of known complex shows the two to be identical. It melts with decomposition at 180° to 200° C.

When allyl alcohol (5 ml.) and 2.1 grams chloroplatinic acid are mixed, heat is given off. Evaporation of allyl alcohol leaves a black syrupy residue. This residue taken up in a minimum of hot benzene yields on cooling a white crystalline solid whose infrared spectrum is identical with that above. The same white crystalline product results from the reaction of allyl ether and chloroplatinic acid (reaction is vigorous) and the black residue is recrystallized from benzene.

A solution containing allyl alcohol (0.439 gram mole), 0.846 gram mole of ethyl alcohol and 0.0019 gram mole of the above complex is combined in apparatus described in Example 2. The white solid did not dissolved. After the addition of 0.006 equivalent of HCl, a homogeneous, yellow solution formed. The solution, after being heated to 80° C., refluxed at 66° C. The resulting reaction mixture is worked up as before. The conversion of allyl alcohol to ethers is 57.9 mole percent and 88.2 mole percent of the ether product is allyl ethyl ether.

The following example illustrates the application of the process of this invention to a continuous process.

*Example 7*

Allyl alcohol (5.72 gram moles) is mixed with concentrated hydrochloric acid (6 ml., 0.0722 equ.), and 75 ml. of this alcoholic solution are added to chloroplatinic acid (1.0 g., 0.0019 mole) in a 100-ml. flask. This flask is equipped with a dropping funnel and is connected to a 12-inch Vigreux column and a receiver. The solution is heated. After one hour, the vapor temperature dropped from 86° to 75° C., and a ternary azeotropic mixture containing allyl ether, allyl alcohol, and water collects in the receiver. The acidic solution of allyl alcohol is slowly added to the reaction mixture from a dropping funnel. After five hours, the reaction slows down, but following the addition of 0.5 ml. of concentrated hydrochloric acid, the reaction continues at the original rate. However, after a few more hours the reaction ceases. This time 0.0085 equ. of sulfuric acid is added to the mixture in the flask. The reaction then proceeds very well. Allyl alcohol is added continuously. The azeotrope containing the ether distills into the receiver. The 400 ml. of allyl alcohol is thus processed in a few hours. The distillate, which separates into two phases, is mixed with 400 ml. of water and extracted twice with 120 ml. n-pentane. The pentane extract is dried, and is distilled through a 60-cm. tantalum-wire column. Allyl ether ($n_D^{20}$ 1.4162) distilling between 91° and 92° C. is collected.

*Example 8*

Ethyl cinnamyl ether is prepared in the following manner. In a reactor as described in Example 2 there are charged 0.500 gram mole ethyl alcohol, $1.9 \times 10^{-3}$ gram mole chloroplatinic acid, 0.1863 gram mole cinnamyl alcohol and 131 grams benzene. To the Dean and Stark tube is added 13 ml. benzene. The solution in the reactor turns orange. It is heated to 70° C. and is maintained at this temperature throughout the reaction. During the reaction an aqueous phase, 6.5 grams, is collected in the Dean and Stark tube. By gas chromatography analysis the aqueous phase is found to contain ethyl alcohol and some benzene in addition to water. The benzene phase is added to the reaction mixture. The reaction mixture is distilled. Material boiling at 65 to 80° C. is found by gas chromatographic analysis to be ethanol and benzene, a total of 141.4 grams. The residue is distilled through a tantalum-wire column at reduced pressure. First the remainder of the benzene is removed. Distillation cuts at 92–95° C. at 5 mm. Hg and 95–96° C. are taken. Infrared spectra of these cuts are identical and are consistent with that of ethyl cinnamyl ether. A 49 mole percent yield of this ether is obtained together with 0.0403 mole of dicinnamyl ether. Ratio of the mixed to dicinnamyl ether on mole basis is 2.3 to 1.

*Example 9*

A solution containing trans-γ-methylallyl alcohol (0.339 gram mole), ethyl alcohol (0.842 gram mole), and chloroplatinic (IV) acid (.0029 gram mole) is heated under reflux in apparatus described in Example 2. The reaction temperature drops from 85° to 75° C. during the reaction. The orange solution becomes golden. No gas evolves and no water separates in the Dean and Stark tube.

The products and unreacted alcohols are distilled from the reaction vessel at 57–85° C., and a sample of this distillate is retained for quantitative analysis. Water is added to the remainder of the distillate and the mixture is extracted with pentane. After it is dried, the pentane extract is distilled through a 60-cm. tantalum-wire column and then fractionated with a 60-cm. spinning-band column. Ethyl α-methylallyl ether distilling at 75.6° C. ($n_D^{20}$ 1.3882) and ethyl trans-γ-methylallyl ether distilling between 99.4° and 99.9° C. ($n_D^{20}$ 1.4040) are collected. Analysis of these ethers with gas chromatography indicates that the purity of the fractionated ethers is 98–99 percent. The physical properties reported in the literature are: ethyl α-methylallyl ether, B.P. 76.6° C., $n_D^{17.4}$ 1.3908; and ethyl trans-γ-methylallyl ether, B.P. 100.4–100.5° C., $n_D^{20}$ 1.4040. The infrared spectra of ethyl trans-γ-methylallyl ether obtained in this reaction and that of an authentic sample are identical. Mass spectra of the two ethers are consistent with the assigned structures.

The residues from fractional distillation and the original distillation are separated on a preparative column of a gas chromatography unit. Pure α-methylallyl γ-methylallyl ether ($n_D^{20}$ 1.4241) and di-γ-methylallyl ether ($n_D^{20}$ 1.4275) are obtained. The infrared spectra and the mass spectra are in accord with the assigned structure. The infrared spectra suggest that only the transinternal olefin is produced. Refractive indices previously reported are: α-methylallyl γ-methylallyl ether, $n_D^{22}$ 1.4245; di-γ-methylallyl ether, $n_D^{22}$ 1.4275. The di-α-methylallyl ether is not isolated and characterized because little is produced and other components present in the sample interfere with its separation on the preparative column. Nevertheless, from the known boiling point of di-α-methylallyl ether (B.P. 123–125° C.) and the boiling points of the other compounds produced in the reaction, a peak in the gas chromatogram corresponding to the ether could be assigned.

Once each peak in the chromatogram is identified, the composition of the products is determined by gas chromatography with a gas-density balance as detector. The results are as follows: ethyl-α-methylallyl ether (0.112 mole); ethyl trans-γ-methylallyl ether (0.052 mole); di-α-methylallyl ether (0.008 mole); α-methylallyl trans-δ-methylallyl ether (0.034 mole); and trans-δ-methylallyl ether (0.009 mole). The unreacted alcohol is primarily α-methylallyl alcohol. Thus, 78.5 mole percent of the alcohol is converted to the five ethers, and of the total ethers produced 76.3 mole percent are monoallylic.

*Example 10*

Experiments paralleling the foregoing are performed with ethyl alcohol and α- and γ-methylallyl alcohols. First, a solution containing trans-γ-methylallyl alcohol, 0.334 gram mole; ethyl alcohol, 0.840 gram mole; and chloroplatinic acid, .0019 gram mole, is heated under reflux conditions. The reaction temperature drops from 85° to 80° C. during the reaction. The solution remains homogeneous. Products and unreacted alcohol (55.1 g.) are recovered by simple distillation, and the platinum (II)-ether complex is retained in the residue (7.9 g.).

α-Methylallyl alcohol, 0.334 gram mole; ethyl alcohol, 0.840 gram mole; and chloroplantinic acid, .0019 gram mole, are brought into reaction as described for γ-methylallyl alcohol. The reaction temperature (reflux) drops from 79° to 76° C. during the reaction. Workup gives a distillate (58.8 g.) and a residue (3.7 g.).

Both distillates and residues are analyzed by gas chromatography. The mole yields of products resulting from these two reactions are:

|  | Trans-γ-Methylallyl Alcohol | α-Methylallyl Alcohol |
|---|---|---|
| Ethyl α-Methylallyl Ether | 0.0937 | 0.0890 |
| Ethyl trans-γ-Methylallyl Ether | 0.0309 | 0.0512 |
| Di-α-Methylallyl Ether | 0.0019 | Trace |
| α-Methylallyl trans-γ-Methylallyl Ether | 0.0526 | 0.0167 |
| Di-trans-γ-Methylallyl Ether | 0.0161 | 0.0029 |

In the γ-methylallyl alcohol reaction, 79 mole percent of the allyl alcohol is consumed to produce the five ethers and trace amounts of four high-boiling compounds. The conversion of α-methylallyl alcohol is 54 mole percent. The latter reaction also produces traces of high-boiling compounds.

Sulfuric acid-catalyzed reaction of trans-γ-methylallyl alcohol, 0.347 gram mole, and ethyl alcohol, 0.842 gram mole with 0.0549 gram mole sulfuric acid results in the production of the following: ethyl α-methylallyl ether, 0.0879 mole; ethyl trans-γ-methylallyl ether, 0.1478 mole; di-α-methylallyl ether, 0.079 mole; α-methylallyl trans-γ-methylallyl ether, 0.0134 mole; and diethyl ether, 0.0013 mole.

This points up the uniqueness of the catalyst system of the present invention in that it provides a process for producing substantial yields of alkyl methylallyl ethers in contrast to the prior art processes.

The following examples illustrate the preparation of mixed alkyl alkenyl ethers by the process of this invention employing transetherification.

Example 11

There are combined 0.102 mole diallyl ether, 0.212 mole ethyl alcohol and 0.001 mole chloroplatinic acid. The resulting mixture is heated to its boiling point and maintained under reflux conditions for 22 hours. The ether-chloroplatinic acid complex is removed as before. Ethyl allyl ether is obtained in a yield of 51 mole percent by distillation.

Example 12

There are combined 0.116 mole ethyl allyl ether, 0.246 mole n-propyl alcohol and 0.00096 mole chloroplatinic acid. The resulting mixture is heated to its boiling point and maintained under reflux conditions for 22 hours. A yield of n-propyl allyl ether of 34 mole percent is obtained.

In place of chloroplatinic acid, platinic chloride or the olefin-ether complex employed as catalysts in the foregoing examples bromoplatinic acid, platinic bromide, iodoplatinic acid, platinic iodide or the olefin-ether complex of bromo or iodoplatinic acids may be employed as catalysts with substantially equivalent results.

The catalyst for the process of this invention appears to involve platinum of a valence of +2 and, as hereinbefore indicated, is believed to be a complex with the allylic alcohol. The use of chloroplatinic acid (Pt valence of +4) results in ether formation only when an allylic alcohol is present, for it has been observed that with only saturated alcohols the use of chloroplatinic acid does not produce ethers. The formation of the catalyst from a +4 valence platinum as in the haloplatinic acids and platinic halides plus mineral acid probably involves the initial reduction of platinum from +4 to +2 as is illustrated by the following:

$$H_2PtCl_6 + RCH_2OH \rightleftharpoons H_2PtCl_4 + RCHO + 2HCl$$

In this reduction it makes little difference whether the alcohol (RCH$_2$OH) is allylic or saturated. In support of this, small amounts of carbonyl compounds have been observed in the ether product. From this reduced form of platinum, a complex with the allylic alcohol results as illustrated by the following:

$$H_2PtCl_4 + CH_2=CHCH_2OH \rightleftharpoons H[Pt(CH_2=CHCH_2OH)Cl_3] + HCl$$

The potassium salt of this illustrative complex is known. From this platinum (+2) complex with allylic alcohol, an allylic ether chelate complex, such as $$(CH_2=CHCH_2)_2O \cdot PtCl_2$$

forms. Such a complex has been recovered as hereinbefore described. This chelate complex appears to have little or no catalytic activity by itself; however, when the chelate complex is used with a mineral acid such as a hydrohalic or sulfuric, catalytic activity is again obtained. The catalyst may be provided by either the platinum (+2)-allylic alcohol complex plus the mineral acid associated therewith, or the H$_2$PtCl$_4$ itself, or the chelate complex and mineral acid or a combination of two or all three of these containing platinum in the +2 valence; however, it is probably provided by the platinum (+2)-allylic alcohol complex.

The catalytic process of this invention may resemble the usual acid-catalyzed reactions of allylic alcohols, but it is believed that there is a distinct difference. In support thereof it is pointed out that the usual acid-catalyzed etherifications involving methylallylic alcohols always give the primary ether. In contrast to this, the catalytic process of this invention involving platinum of a valence of +2 produces the secondary ether from methylallylic alcohols, such as $$CH_2=CHCH-OR$$
$$\phantom{CH_2=CHC}|$$
$$\phantom{CH_2=CHCH}CH_3$$

It is also of interest that with ethyl alcohol both alpha and gamma methylallyl alcohols in the process of this invention resulted in substantially the same distribution of ethyl α-methylallyl ether and ethyl-γ-methylallyl ether.

In view of the foregoing, the catalyst of this invention is defined in the claims appended hereto as a "platinum (II)-allylic alcohol complex" where "platinum (II)" is employed to indicate platinum of a valence of +2.

We claim:
1. The preparation of an ether containing at least one mono-olefinic group selected from the class consisting of allyl, methallyl and cinnamyl by the reaction of reactants selected from the class consisting of:
    (a) an allylic alcohol selected from the class consisting of allyl, methallyl and cinnamyl alcohols,
    (b) said allylic alcohol and an alcohol free from olefinic unsaturation selected from the class consisting of alkyl alcohols whose alkyl groups contain C$_1$ to C$_8$ saturated hydrocarbon groups, benzyl alcohol and phenylethyl alcohol, and
    (c) said allylic alcohol and an allylic ether selected from the group consisting of di(allylic) ethers and alkyl allylic ethers whose allylic group is selected from the group consisting of said allylic alcohol but differing from the allylic group of said allylic alcohol reactant and whose alkyl group is selected from the alkyl groups of said alkyl alcohol
in the presence of a catalyst member selected from the class consisting of:
    (1) chloroplatinic acid,
    (2) platinic chloride and a mineral acid,
    (3) a mineral acid and platinum (II) chloride complex with allylic ether containing said mono-olefinic group, and
    (4) chloroplatinic acid complex with said allylic alcohol and associated hydrogen chloride;
at a temperature below the decomposition temperature of said complex.
2. The process of claim 1 wherein the catalyst complex is provided by allylic ether chelate of an ether selected from the class consisting of allyl, methallyl and cinnamyl ethers with a platinum (II) chloride and a mineral acid in the proportions of at least two equivalents thereof per equivalent of said chelate complex.

3. A transetherification process for the preparation of a mixed ether containing one allyl group which comprises reacting in the presence of allyl alcohol complex with chloroplatinic acid at a temperature up to about 100° C. an alkyl allyl ether with an alkyl alcohol whose alkyl group differs from that in the alkyl allyl ether when the alkyl groups of both reactants are selected from the class consisting of $C_1$ to $C_8$ alkyl hydrocarbon groups, benzyl and phenylethyl groups; and recovering the new mixed ether formed.

4. A process for the preparation of diallyl ether which comprises heating a mixture comprising allyl alcohol, benzene and chloroplatinic acid at the boiling point of mixture and recovering diallyl ether.

5. The process for the preparation of ethyl allyl ether which comprises heating diallyl ether, ethyl alcohol and chloroplatinic acid at the boiling point of the mixture and recovering ethyl allyl ether.

6. A continuous process for the preparation of an ether containing at least one mono-olefinic group selected from the class consisting of allyl, methallyl and cinnamyl which comprises continuously adding a mixture of (a) a mono-olefinic alcohol selected from the class consisting of allyl, methallyl and cinnamyl alcohols, (b) an alcohol selected from the class consisting of an alkyl alcohol whose alkyl group contains $C_1$ to $C_8$ saturated alkyl hydrocarbon groups, benzyl and phenylethyl groups and said allyl groups, (c) chloroplatinic acid and (d) an amount of mineral acid in the ratio of two equivalents thereof per equivalent of the platinum (II)-complex formed in situ; to a reaction zone maintained at the boiling point of the mixture, and withdrawing from the reaction zone a mixture containing said ether.

7. A process for the preparation of a mixed ether having one each of a $C_1$ to $C_8$ saturated alkyl hydrocarbon group and of a monoolefinic group selected from the class consisting of allyl, methallyl and cinnamyl groups wherein the unsaturation in said olefinic group is allylic with respect to the ether oxygen; which process comprises reacting at a temperature up to 100° C. a mono-olefinic alcohol selected from the class consisting of allyl, methallyl and cinnamyl alcohols with an alkyl alcohol whose alkyl group contains $C_1$ to $C_8$ saturated hydrocarbon groups in the presence of as a catalyst a complex of the reaction of chloroplatinic acid with an allylic alcohol selected from the class consisting of allyl, methallyl and cinnamyl alcohol and hydrogen chloride, and recovering the mixed ether.

8. A process for the preparation of an alkyl allyl ether which comprises heating at a temperature up to 100° C. a mixture of allyl alcohol and an alkyl alcohol whose alkyl group is a $C_1$ to $C_8$ saturated hydrocarbon group in the presence of as a catalyst the complex of the reaction of chloroplatinic acid with allyl alcohol and hydrogen chloride and recovering the alkyl allyl ether.

References Cited in the file of this patent

Milgrom et al.: Abstracts of Papers, 136th Meeting Amer. Chem. Soc. (September 1959), page 64P.